United States Patent [19]
Kozuki et al.

[11] Patent Number: 6,156,452
[45] Date of Patent: Dec. 5, 2000

[54] NON-AQUEOUS ELECTROLYTE SECONDARY CELL

[75] Inventors: Kiyomi Kozuki; Seiichi Uemoto; Takabumi Fujii, all of Osaka, Japan

[73] Assignee: Matsushita Electric Indsutrial Co., Ltd., Osaka, Japan

[21] Appl. No.: 09/319,500

[22] PCT Filed: Oct. 6, 1998

[86] PCT No.: PCT/JP98/04509

§ 371 Date: Jun. 7, 1999

§ 102(e) Date: Jun. 7, 1999

[87] PCT Pub. No.: WO99/18622

PCT Pub. Date: Apr. 15, 1999

[30] Foreign Application Priority Data

Oct. 7, 1997 [JP] Japan .................................. 9-274118

[51] Int. Cl.[7] .................................................. H01M 4/02
[52] U.S. Cl. ........................ 429/211; 429/161; 429/178; 429/179; 429/65
[58] Field of Search .................................... 429/211, 209, 429/161, 178, 179, 163, 65, 167, 170, 160; 29/623.4

[56] References Cited

U.S. PATENT DOCUMENTS

| | | | |
|---|---|---|---|
| 3,116,172 | 12/1963 | Wilke et al. | 136/107 |
| 3,393,095 | 7/1968 | Philipp | 136/14 |
| 4,322,484 | 3/1982 | Sugalski | 429/94 |
| 5,849,431 | 12/1998 | Kita et al. | 429/164 |

FOREIGN PATENT DOCUMENTS

| | | |
|---|---|---|
| 1-255164 | 10/1989 | Japan . |
| 7-235289 | 9/1995 | Japan . |
| 8-102313 | 4/1996 | Japan . |
| 9-17441 | 1/1997 | Japan . |
| 9-92258 | 4/1997 | Japan . |

OTHER PUBLICATIONS

Japanese language search report for Int'l Appln No. PCT/JP98/04509 dated Dec. 22, 1998.
Form PCT/ISA/210.

*Primary Examiner*—Maria Nuzzolillo
*Assistant Examiner*—R. Alejandro
*Attorney, Agent, or Firm*—Ratner & Prestia

[57] ABSTRACT

A collector terminal for a non-aqueous electrolyte secondary battery, especially a large-size battery, is provided which is free from breakage when its exterior terminal is fastened with a nut with an excessive torque, superior in electrical conductivity, and high in reliability. The section of the collector terminal forming an exterior terminal and the section where lead plates taken out from the electrode group consist of different types of metals, which are integrated by solid-phase bonding or by vacuum brazing. Among the solid-phase bonding methods, diffusion bonding, explosion pressure welding, and friction bonding are effective.

13 Claims, 6 Drawing Sheets

NON-AQUEOUS ELECTROLYTE SECONDARY CELL

THIS APPLICATION IS A U.S. NATIONAL PHASE APPLICATION OF PCT INTERNATIONAL APPLICATION PCT/JP98/04509.

FIELD OF THE INVENTION

The present invention relates to a structure of a non-aqueous electrolyte battery, in particular to structures of a section of a collector terminal for electrical connection with the outside and of a section for electrical connection with lead plates of electrodes.

BACKGROUND OF THE INVENTION

In recent years, small-size, light-weight, and high energy-density secondary batteries have been in demand as power sources for electronic equipment including audio visual equipment, personal computers and the like, and for communications equipment. On the other hand, in large-size batteries including batteries for electric vehicles, research and development in the area of environmental problems are being conducted and high-capacity, high-output, and high-voltage secondary batteries have been requested. Among these batteries, lithium secondary batteries are greatly expected. Especially in large-size lithium secondary batteries, vibration resistance is required so that no problems of connections such as breakage of lead plates due to vibration will occur when on board a vehicle as a power supply, in addition to the requirement for improvements in large-current load characteristic accompanying increasingly higher output and in longer life.

Generally speaking, lithium secondary batteries which are currently being the mainstream batteries employ in the positive electrode complex oxide of lithium and transition metals such as lithium cobaltate, lithium nickelate, and lithium manganate, and in the negative electrode carbon material which can intercalate and de-intercalate lithium ions, and a non-aqueous electrolyte as the electrolyte. As the positive electrode potential of these lithium secondary batteries is as high as 4 volts or greater, aluminum (Al) which has a high-voltage resistance and a high corrosion resistance is usually used as the collector material of the positive electrode and the structural material of seal plate and the like. Also, in the negative electrode, copper (Cu) which has a superior electrical conductivity is generally used.

Figure 6:
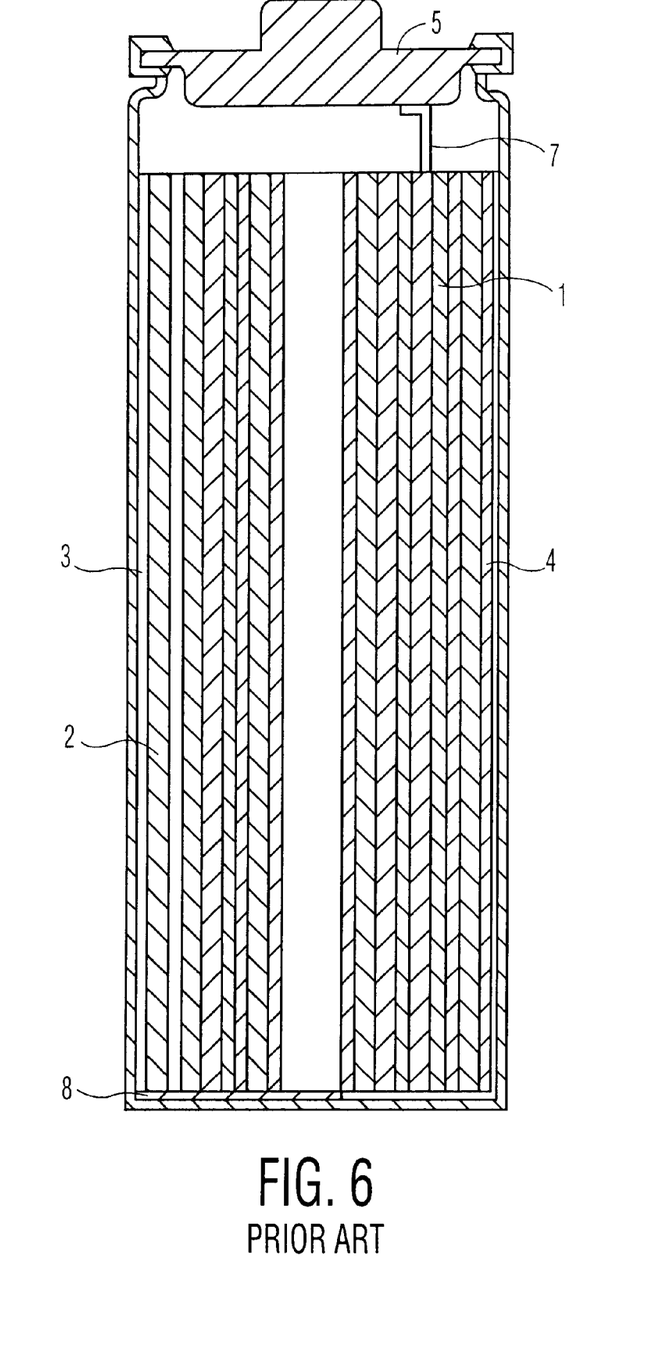
FIG. 6 is a cross-sectional view of a prior art battery.

Also, to each of the band-shaped positive electrode and negative electrode, a lead plate is generally connected by welding and other method at the central or end portion. An electrode group is made by laminating these electrodes with a separator interposed and spirally winding, and the lead plates are electrically connected to collector terminals by welding and other method as shown in FIG. 6 thus allowing to take out a current through the lead plates.

With large-size batteries, there has been a demand for improvement in the load characteristic in association with the trend toward higher output. In this case, it is necessary to increase the area of the electrodes so that the current density per unit area of the electrodes will not become excessive. However, in practice, there being a certain limit to increasing the electrode areas by increasing the dimension in the direction of the height of the unit cell, namely, in the direction of the width of the electrodes, improvement of the load characteristic at higher outputs is being performed by increasing the length of the electrodes.

In connecting a multiplicity of large cells, cable and other connecting members are sometimes affixed using a collector terminal on which a bolting portion has been formed. In doing this, when aluminum (Al) is used for the collector terminal, strength-wise failure is sometimes caused as the bolt is easy to be broken when a nut is screwed or deformation of the connecting section results due to the compression of the foot section of the bolt.

Also, aluminum (Al) is easy to be oxidized causing an increase in the electrical resistance and an accompanying decrease in the electrical conductivity. It is generally considered difficult to apply plating such as nickel (Ni) plating to prevent oxidation. To address these problems, there is a method to form the section having the bolting portion with stainless steel and the like which has a greater tensile strength than aluminum (Al), and the other section with aluminum (Al), and fasten them with a screw to avoid from becoming loose.

In this case, although the weak point of breakage of the bolting portion due to fastening of the nut is remedied by using a high strength material, it has a disadvantage of causing an increase in the resistance of the terminal section due to resistance between different types of metals and of having insufficient hermeticity.

The present invention addresses the above-described problems and aims at providing a collector terminal for a non-aqueous electrolyte battery provided with a high-reliability bolting terminal with which the bolting portion is not easily broken or its foot portion does not become loose even when the bolt is fastened with an excessive torque thus maintaining the characteristic of aluminum (Al) superior in high-voltage resistance and in high corrosion resistance.

With regard to the electrode structure, as the volume the electrodes can occupy inside a battery case is limited, even though the thickness of the electrodes becomes smaller and the current density per unit area of the electrodes decreases as their length is made longer, the distance to the lead plates becomes greater by the amount the area has been increased and the electrical resistance becomes greater, thus not fully exhibiting the merit of increasing the electrode area.

Figure 7:
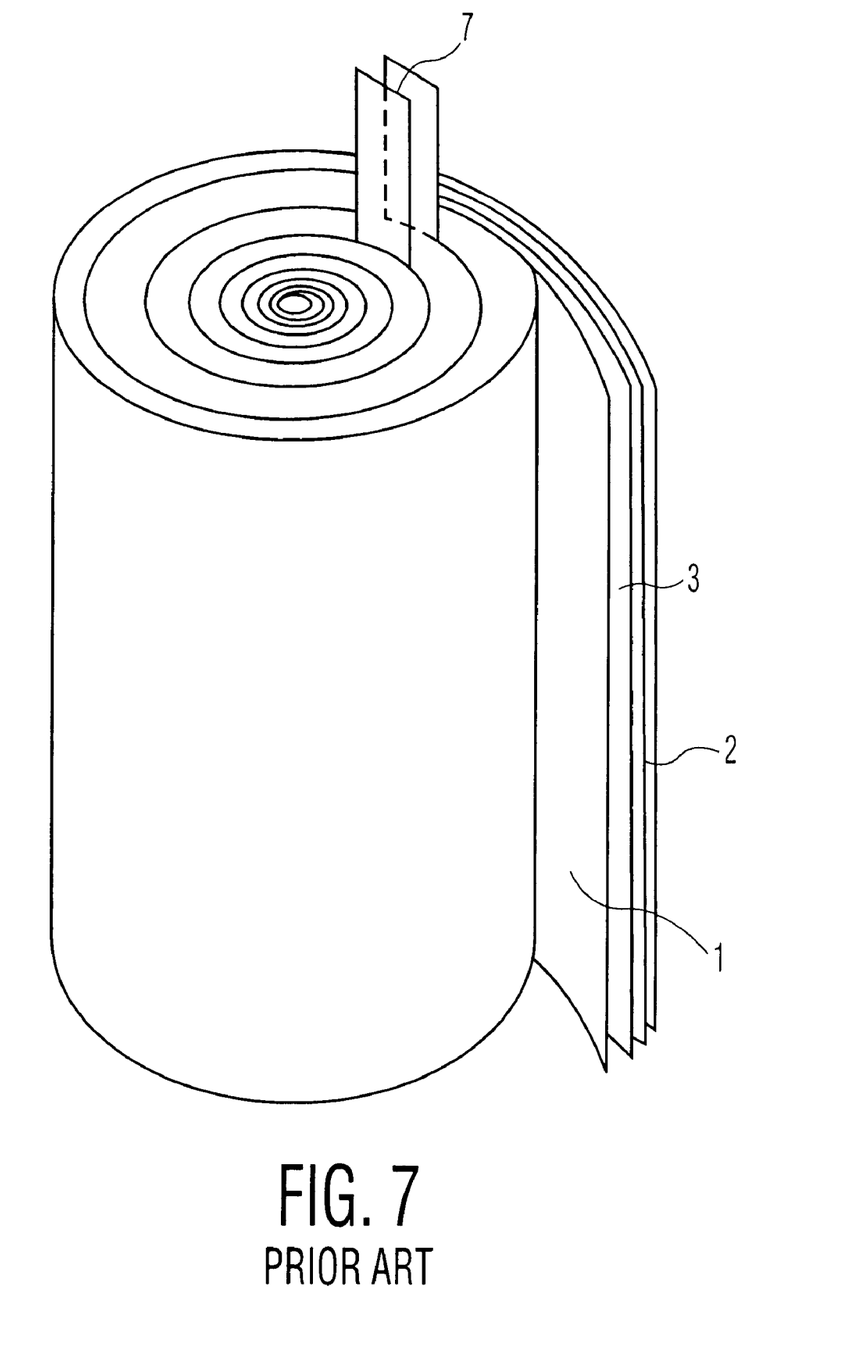
FIG. 7 is a perspective view of a prior art electrode group.

There exists a method to solve this problem by affixing two or more lead plates in a group onto the same electrode as illustrated in FIG. 7, and taking out the lead plates in parallel in the same direction for connection with the collector terminal. With this structure, though the above problem may be solved, there is a risk of the lead plates being broken due to vibration when used on board a vehicle as a power supply.

The present invention addresses these problems and provides a highly vibration-resistant non-aqueous secondary battery which is free from troubles in the connecting section such as breakage of the lead plates due to vibration, shock, and so on, especially in a large size battery.

SUMMARY OF THE INVENTION

To address the above described problems associated with the terminal member, in the present invention the section forming an exterior terminal and the section to which lead plates taken out from the electrode group are connected comprise different types of metals, and the metals are integrated into one piece by solid phase bonding or vacuum brazing. Also, the electrode structure is such that a multiplicity of lead plates is secured with screws or rivets, and screws or rivets are provided for securing the lead plates on the collector terminal which is electrically connected with the lead plates by welding and other method thus solving the above problems.

With the non-aqueous electrolyte secondary battery in accordance with the present invention, the collector terminal of at least one of the positive and negative electrodes comprises a section projecting outwardly forming an exterior terminal and a section where the lead plates taken out from the electrode group inside the battery case are connected, the two sections consisting of different types of metals the interface thereof being integrated by solid-phase bonding or vacuum brazing, thus providing a collector terminal which is stable at the electrode potential and has a low electrical resistance and a strength to be exhibited when subjected to processing.

The preferable method of solid-phase bonding is either of diffusion bonding, explosion pressure welding, and friction bonding.

Also, in the case of the positive electrode collector terminal, the type of the metal of the section forming the exterior terminal is preferably either of iron (Fe), nickel (Ni), stainless steel, and copper (Cu) from the standpoint of having a mechanical strength, and the type of metal of the section where the lead plates are connected is preferably aluminum (Al) because of stability even when the potential of the positive electrode is high.

On the other hand, in the case of the negative electrode collector terminal, though strength is secured even with usually used copper (Cu) alone when compared with aluminum (Al) alone which has heretofore been used in the positive electrode, if necessary, either of iron (Fe), nickel (Ni), and stainless steel which have a mechanical strength greater than that of copper (Cu) may be used as the type of metal forming the terminal, and copper (Cu) in the section where lead plates are connected.

Also, as regards the electrode structure, a multiplicity of lead plates that are taken out are secured with screws or rivets, and screws or rivets are disposed on the collector terminal which is electrically connected with the lead plates by welding and other method to secure the lead plates.

Figure 1:
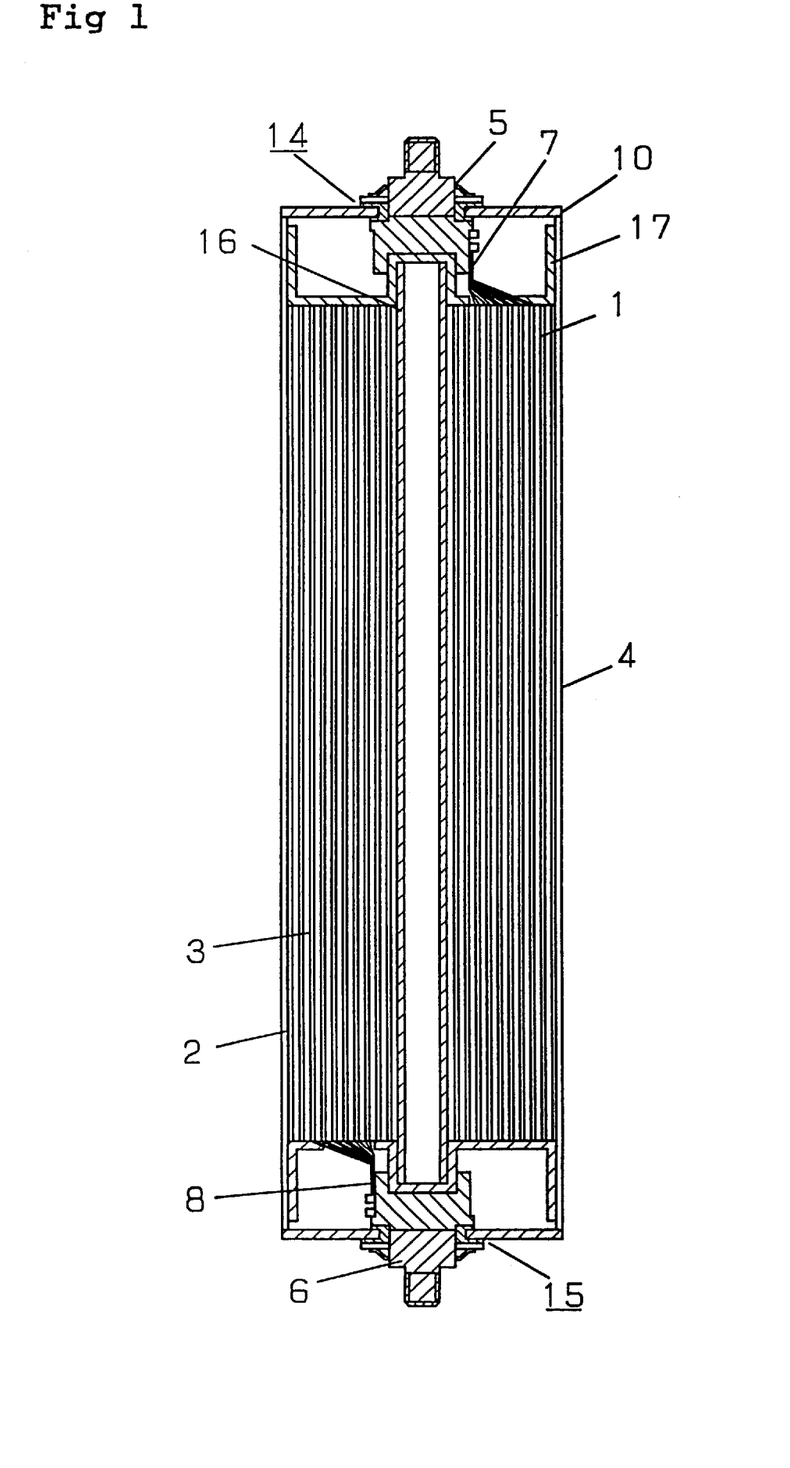
FIG. 1 is a vertical cross-sectional view of a non-aqueous electrolyte secondary battery of the present invention.

Referring now to FIG. 1, exemplary embodiments of the present invention will be described. FIG. 1 is a vertical cross-sectional view of a battery in accordance with the present invention. The description that follows is meant as an example and the present invention is not bound by it.

In a non-aqueous electrolyte secondary battery comprising an electrode group comprising a positive electrode 1, negative electrode 2, and a separator 3, a non-aqueous electrolyte comprising an organic electrolyte, and a battery case 4 to house them, a positive electrode collector terminal 5 and a negative electrode collector terminal 6 are either made of one type of metal, or the section forming an exterior terminal outwardly projecting from the battery case 4 and the section where the lead plates are connected and housed inside the battery case 4 are made of different types of metals, the interface thereof being bonded by solid-phase bonding or vacuum brazing.

In the following, a description is made of bonding different types of metals in accordance with the present invention.

Among the methods of bonding materials that are currently generally in practice, those based on formation of metallurgical bond at the joint can be classified into fusion bonding, brazing, and solid-phase bonding. Of these, the fusion bonding method is the most widely used technique.

However, depending on the type and shape of materials to be bonded, solid-phase bonding and vacuum brazing may be more appropriate than the fusion bonding method. For example, in bonding different types of metals by the fusion bonding method, when one of the metals is aluminum (Al) or copper (Cu), if a high energy-density heat source such as in electron beam welding or laser welding is used, efficiency of heating by laser irradiation is low because reflectivity of high electrical conductivity metals such as aluminum (Al) and copper (Cu) is very large. For this reason, when a high power is introduced, thermal hysteresis of the materials to be welded becomes extremely fast thus causing a crack during solidification and laser welding is not appropriate.

One of the methods of bonding different types of metals in the collector terminal of the present invention is to use the solid-phase bonding in which bonding is performed by pressurizing to an extent beyond which plastic deformation will be caused at a temperature below the melting point of the mother material to be bonded, and utilizing diffusion of atoms that takes place between different types of metals at the joint. There is no fear of causing a crack during solidification.

Also, one of the methods of bonding different types of metals in the collector terminal of the present invention is to use vacuum brazing among other brazing techniques. As vacuum brazing is free from oxidation, carburization, or decarburization of the mother material, it presents a large merit in heating such metals as stainless steel and aluminum (Al) which are very easily oxidized. Furthermore, as no flux is required, no pre-processing or post-processing is required and clean bonded surface is obtained.

A description of the positive electrode collector terminal of the present invention is given in the following. With the positive electrode collector terminal, the type of metal of the section forming the exterior terminal is either of iron (Fe), nickel (Ni), stainless steel, or copper (Cu), and the type of metal of the section where lead plates are connected is aluminum (Al).

In the collector terminal, when the above metals are used in the section forming the exterior terminal outside of the battery, as the strength is relatively high, no breakage of the bolting portion or deformation of the foot portion due to compression will be caused even when a bolting portion is formed and is fastened with a nut with an excessive torque in connecting a cable and the like.

Also, in the collector terminal, when using aluminum (Al) in the section to be connected with the lead plates inside a battery, it is possible to obtain a characteristic superior in voltage resistance, corrosion resistance, and electrical conductivity.

In the following, a description is given on the negative electrode collector terminal of the present invention. In the negative electrode collector terminal, the type of metal of the section forming the exterior terminal is iron (Fe), nickel (Ni), or stainless steel, and the section where lead plates are connected is copper (Cu). In the collector terminal, when the above metals are used in the section forming the exterior terminal outside of the battery, as the strength is relatively high, no breakage of the bolting portion or deformation of the foot portion due to compression will be caused even when bolting portion is formed and is fastened with a nut with an excessive torque in connecting a cable and the like. Also, when copper (Cu) is used in the collector terminal on the section to be connected with lead plates inside a battery, a characteristic superior in electrical conductivity can be obtained.

Referring to FIG. 1, a description is given in the following on an example configuration of bonding lead plates and a collector terminal housed inside a battery case. FIG. 1 is a cross-sectional structural view of the present invention. In a non-aqueous electrolyte secondary battery comprising an electrode group comprising a positive electrode 1, a negative electrode 2, and a separator 3, a non-aqueous electrolyte comprising an organic electrolyte, and a battery case 4 to house them, each of the positive electrode 1 and the negative electrode 2 has a multiplicity of respective aluminum (Al) lead plates 7 and copper (Cu) lead plates 8 taken out from one end. The multiplicity of leads plates 7 and 8 taken out in parallel in the same direction from the respective positive and negative electrodes are secured by screws or rivets. The aluminum positive lead plates 7 and the section inside the battery of the positive electrode collector terminal 5 consisting of aluminum are secured by screws or rivets and are further electrically connected by ultrasonic welding.

On the other hand, the copper negative lead plates 8 and the section inside the battery of the negative electrode collector terminal 6 consisting of copper are secured by screws or rivets, and are further electrically connected by ultrasonic welding.

For bonding metals having a high electrical conductivity such as copper and aluminum, it is preferable to use ultrasonic welding. As laser welding, which is one of the fusion welding techniques, has a poor heating efficiency, introduction of a high power is required thus lowering productivity, making maintenance difficult, ending in poor workability. The problems of causing a crack during solidification due to thermal influence and deformation of the joint are also large. Resistance welding suffers the same problems.

On the contrary, with the ultrasonic welding, metal atoms are diffused by applying high frequency vibration to the portions to be bonded and bonding is completed by recrystallization, thus a high temperature is not reached, melting or formation of fragile structure caused by casting will not occur, and no fear of causing a crack during solidification exists. Also the deformation of the joint is small. It is also advantageous over laser welding and other methods when allowing a large current to flow as the bonding area is larger. Maintenance is also easy, and productivity is high.

When ultrasonically welding a multiplicity of lead plates to the collector terminal in this way, the fact that the lead plates and the collector terminal have been secured in advance with screws or rivets helps enhance the workability and prevents breakage of the joints between each electrode and lead plates and dropping of compound layer of each electrode (active material layer) due to vibration as ultrasonic vibration is absorbed. Therefore, in the event the section electrically connected by welding comes off by vibration and shock when aboard a vehicle as a power supply, a route of electrical conduction can be secured.

DESCRIPTION OF THE PREFERRED EMBODIMENTS

Referring now to drawings, a description will be given in the following on exemplary embodiments of the present invention.

Embodiment 1

Figure 2:
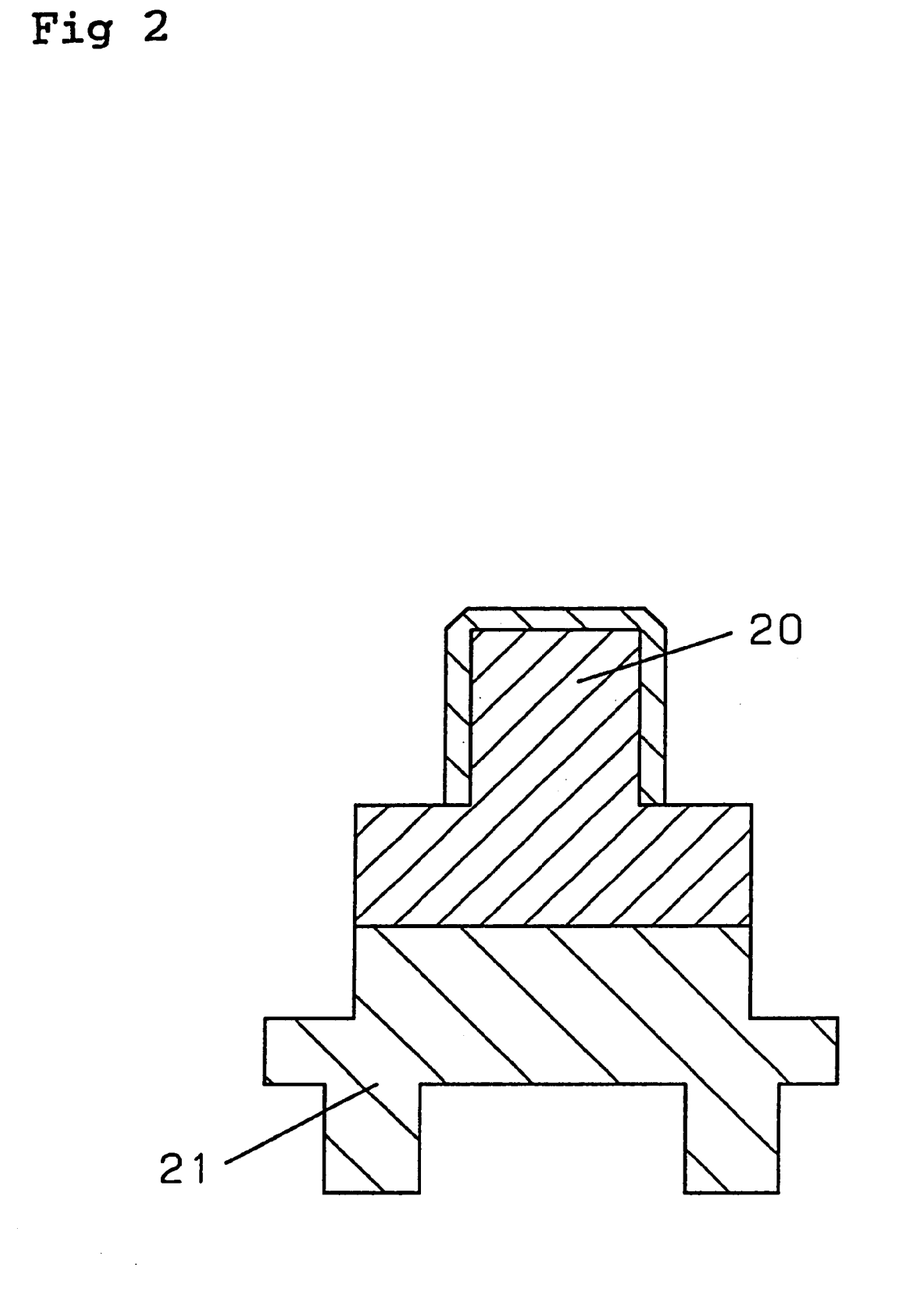
FIG. 2 is a vertical cross-sectional view of a collector terminal of a non-aqueous electrolyte secondary battery of the present invention.

Elements of a positive electrode collector terminal were bonded by hot isotropic pressurization technique (HIP) as shown in FIG. 2. First the surfaces to be bonded of an aluminum section 21 which is to be electrically connected with lead plates inside a battery case and a stainless steel section 20 which projects outwardly of the battery case and functions as an exterior terminal were polished to a surface roughness of 10 μm or below, then they were introduced into a metal capsule, followed by de-aeration and hermetic sealing.

It being preferable that the surfaces to be bonded be in a vacuum($10^{-2}$ to $10^{-1}$ Pa or greater), the entire capsule was introduced into an electric furnace and de-aerated in a vacuum while heating at 300° C.

The vacuum de-aerated capsule was introduced into an HIP apparatus, where the temperature and the pressure were simultaneously increased to 1100° C. and 100 Pa, respectively, in 4 hours and were kept for 4 hours. Subsequently, the temperature and pressure were decreased in 4 hours. After machining including formation of a bolting portion in the stainless steel section of the obtained positive collector terminal, the collector terminal was nickel plated. The obtained positive terminal is referred to as terminal A.

Embodiment 2

Next, elements of the positive electrode collector terminal shown in FIG. 2 were bonded by friction bonding method.

The aluminum section 21 of the positive electrode collector terminal was inserted onto a stationary bed and clamped. On the other hand, the stainless steel section 20 of the positive electrode collector terminal was inserted onto a rotating bed and clamped. The rotating bed was started to rotate at 1000 r.p.m. and the stationary bed was moved toward the rotating bed, and materials-in-contact heating was started at a frictional pressure of 49 MPa for a duration of friction of 3 seconds.

Then by suddenly stopping the rotation by pressing at an upset pressure of 78.5 MPa for an upset time of 6 seconds, a product in which the aluminum section and the stainless steel section had been bonded was obtained. By machining the obtained positive electrode collector terminal to a predetermined configuration, a bolting portion was formed on the stainless steel section and was nickel plated. The positive terminal thus obtained is referred to as terminal B.

Embodiment 3

Elements of the positive electrode collector terminal shown in FIG. 2 were bonded by explosion pressure welding technique.

The aluminum section 21 of the positive electrode collector terminal and the stainless steel section 20 were set with a gap in between and an explosive and a detonator were set on the aluminum section. By detonating the explosive, a layer of gas absorbed in the oxidized film on the surface was eliminated by a striking flow of the two metals at time of collision caused by downward force, and the activated surfaces were metallurgically bonded.

By machining the obtained positive electrode collector terminal to a predetermined configuration, a bolting portion was formed on the stainless steel section and was nickel plated. The positive terminal thus obtained is referred to as terminal C.

Embodiment 4

Elements of the positive electrode collector terminal shown in FIG. 2 were bonded by vacuum brazing technique.

Of the positive electrode collector terminal, each of the aluminum section 21 and the stainless steel section 20 was degreased with acetone, and was fixed by a jig with magnesium (Mg) as the brazing material interposed on the surfaces to be bonded. They were then introduced into a vacuum furnace and heated up to 600° C. in a vacuum of $10^{-4}$ to $10^{-5}$ Torr to evaporate the magnesium, and they were excellently bonded as the vapor pressure had destroyed oxide film on the surfaces to be bonded.

By machining the obtained positive electrode collector terminal to a predetermined configuration, a bolting portion was formed on the stainless steel section and was nickel plated. The positive terminal thus obtained is referred to as terminal D.

Comparison 1

Figure 4:
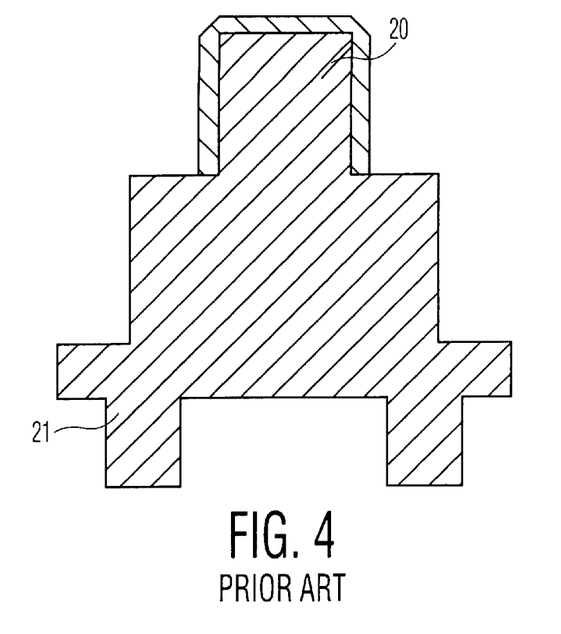
FIG. 4 is a cross-sectional view of a prior art collector terminal.

A positive electrode collector terminal as shown in FIG. 4 was fabricated in which the entirety of 20 and 21 consists of aluminum (A 1050), and a bolting portion has been formed on the part of 20 by machining to a predetermined configuration. The positive terminal thus obtained is referred to as terminal E.

Comparison 2

Figure 5:
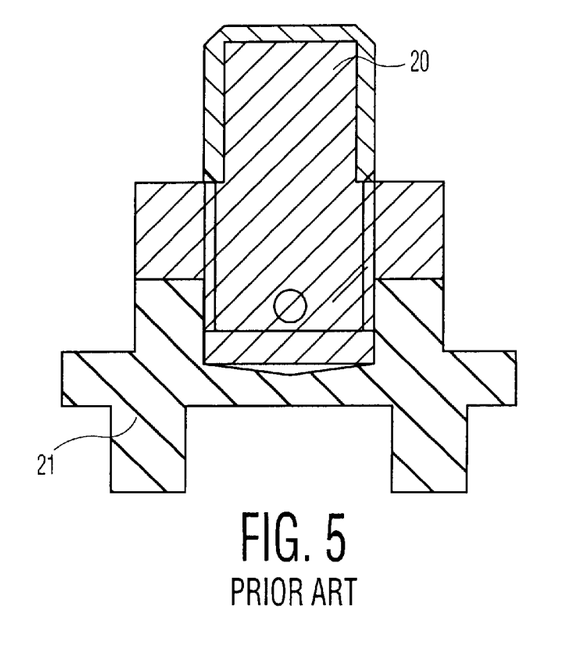
FIG. 5 is a cross-sectional view of another prior art collector terminal.

A positive electrode collector terminal as shown in FIG. 5 was fabricated by composing the section 21 to which the lead plates of the positive electrode of the positive electrode collector terminal are to be connected and which is to be housed inside the battery case with aluminum (Al 050) and machining to a predetermined configuration, and composing the section 20 which projects outwardly of the battery case and functions as an exterior terminal with stainless steel (SUS 316L), machining to a predetermined configuration, and securing the two members with screws. The positive terminal thus obtained is referred to as terminal F.

Embodiment 5

Elements of the negative electrode collector terminal as shown in FIG. 2 were bonded by hot isotropic pressurization (HIP) technique. First the surfaces to be bonded of the copper section 21 which is to be electrically connected with lead plates inside a battery case and the stainless steel section 20 which projects outwardly of the battery case and functions as an exterior terminal were polished to a surface roughness of 10 µm or below, then the two sections were introduced into a metal capsule, followed by de-aeration and hermetic sealing.

It being preferable that the surfaces to be bonded be in a vacuum($10_{-2}$ to $10_{-1}$ Pa or greater), the entire capsule was introduced into an electric furnace and de-aerated in a vacuum while heating at 300° C.

The de-aerated capsule was introduced into an HIP apparatus, where the temperature and pressure were respectively simultaneously increased to 1100° C. and 100 Pa in 4 hours and were kept for 4 hours. Subsequently, the temperature and pressure were decreased in 4 hours. After machining the obtained negative electrode collector terminal including formation of a bolting portion in the stainless steel section, the collector terminal was nickel plated. The negative terminal thus obtained is referred to as terminal G.

Comparison 3

A negative electrode collector terminal as shown in FIG. 4 was fabricated, in which the entirety of 20 and 21 consists of copper, a bolting portion has been formed on the part of 20, and machining to a predetermined configuration has been done. The negative terminal thus obtained is referred to as terminal H.

Embodiment 6

In this embodiment, a battery having a cross-sectional structure as shown in FIG. 1 was fabricated. The negative electrode employed as the main material graphite which can intercalate and de-intercalate lithium, and the positive electrode employed lithium-cobalt complex oxide as the active material.

The negative electrode was prepared by mixing to graphite 5 weight % of polyvinylidene fluoride powder to the weight of the entire negative electrode, and adding N-methyl-2-pyrrolidinone to make a paste. Then the obtained paste was coated on a collector body made of copper and dried.

On the other hand, the positive active material was prepared by mixing 3 weight % of powder of acetylene black to the weight of the positive active material and 5 weight % of polyvinylidene fluoride powder, and adding N-methyl-2-pyrrolidinone to make a paste. Then the obtained paste was coated on a collector body made of aluminum and dried to obtain the positive electrode.

Lead plates made of aluminum and of copper were provided by ultrasonically welding to one end of each respective obtained positive and negative electrodes in a manner such that the respective lead plates can be taken out in the same direction in parallel. A cylindrical electrode group, 58 mm in external diameter and 200 mm in length, was fabricated by spirally winding the positive and negative electrodes on a core for winding 16 with a polyethylene separator interposed.

As the positive electrode collector terminal, the terminal A of the embodiment 1 was used, whereas the terminal G of the embodiment 5 was used as the negative electrode collector terminal.

Figure 3:
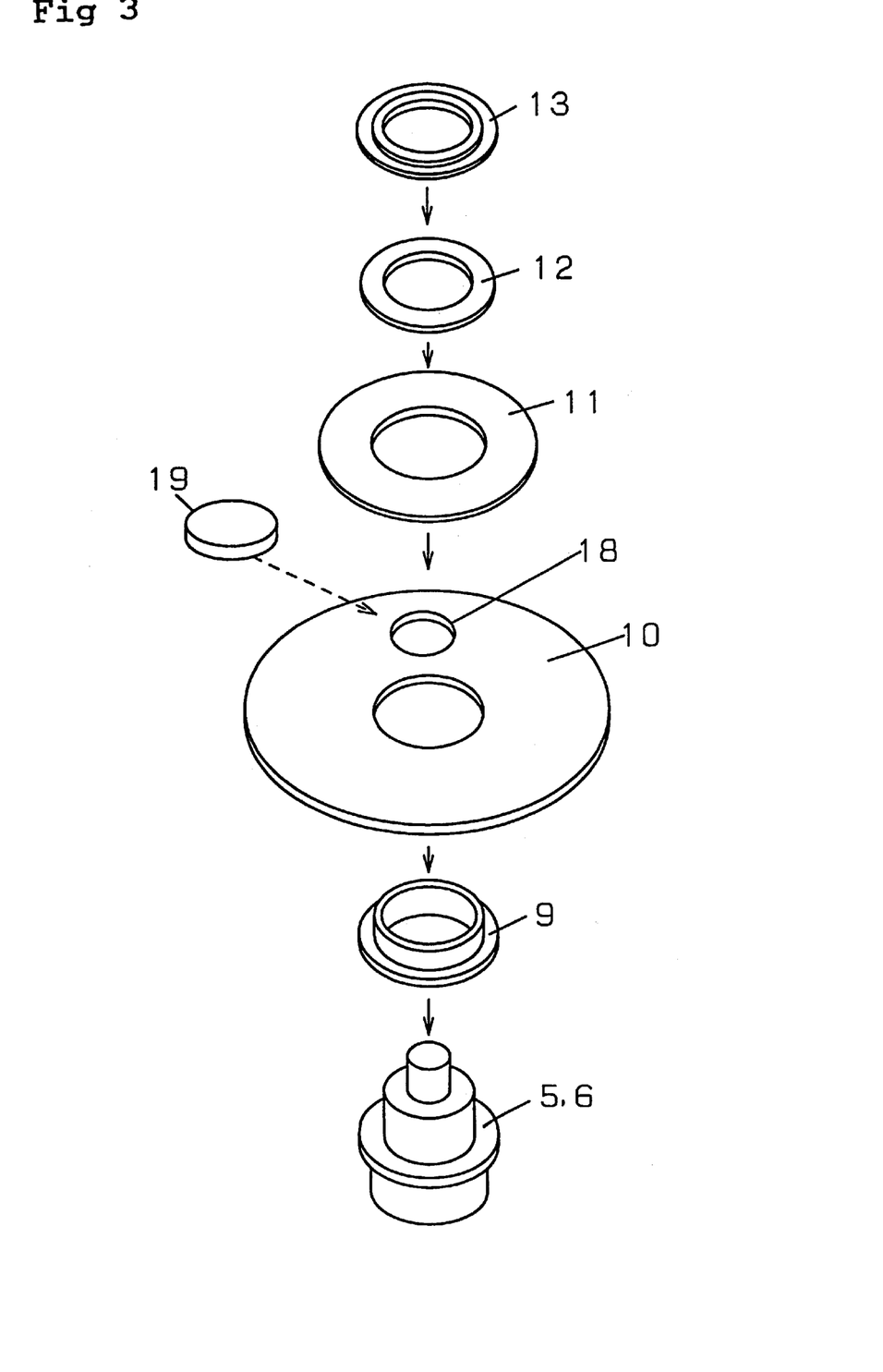
FIG. 3 is a drawing to illustrate assembling of a seal plate of a non-aqueous electrolyte secondary battery of the present invention.

A positive electrode seal plate was fabricated as the following. As shown in FIG. 3, an insulating gasket 9 made of resin was inserted into the positive electrode collector terminal 5, followed by insertion of a cover plate 10 made of stainless steel, an insulating gasket 11 made of resin, and a washer 12 made of stainless steel. Subsequently, a push nut 13 made of stainless steel was inserted and pressurized with a press to fasten. The positive electrode collector terminal 5 and the cover plate 10 were insulated via the insulating gasket 9 made of resin, and hermeticity was secured by fastening with the push nut 13. The positive electrode seal plate 14 was fabricated in this way.

A negative electrode seal plate 15 was fabricated in the same manner as the positive electrode seal plate 14 with the exception of use of a negative electrode collector terminal 6, and lack of a pouring hole 18 and a sealing cover 19.

In this embodiment, the fabricated electrode group was inserted into a stainless steel battery case 4, 60 mm in external diameter and 250 mm in length, an insulating plate 17 made of resin, was introduced from one of the open ends to sit on top of the electrode group. Subsequently, negative electrode lead plates 8 were taken out through a hole previously provided on the insulating plate 17 made of resin.

Copper rivets were inserted into holes previously drilled on the negative lead plates 8 and the negative electrode collector terminal 6, which were then secured by riveting them, and further bonding by ultrasonic welding. The periphery of the negative electrode cover plate 10 and the battery case 4 were sealed by ultrasonic welding. Subsequently, the insulating plate 17 made of resin was also introduced from the other open end, namely on the side of the positive electrode, of the battery case 4, and the same process was carried out on the positive electrode as had been done on the negative electrode except that the rivets and the portion of the collector terminal where rivets were to be riveted consisted of aluminum. A prepared electrolyte was poured through a pouring hole 18 provided on the positive electrode seal plate 14. Here, the electrolyte was prepared by dissolving $LiPF_6$ into equal-volume solvents of ethylene carbonate and diethyl carbonate to a concentration of 1 mol/l. The pouring hole 18 was then covered with a pouring hole sealing cover 19 made of stainless steel and sealed by laser welding. The battery thus obtained is referred to as battery "a" of the present invention.

Comparison 4

A battery was obtained in the same manner as the battery "a" of the embodiment 6 with the exception of not securing the lead plates taken out from the electrode group with rivets and the like, and not securing the vicinity of the portion welded with the collector terminal with rivets and the like, and is referred to as battery "b".

Table 1 shows results of a study as to whether the maximum tensile load at time of rupture caused by gradually increasing a load applied in the axial direction to the terminals A to D and G of the embodiments of the present invention and to the terminals E, F, and H for comparison satisfies an arbitrarily set minimum tensile load criterion. The table also shows results of measurement by helium leak test of hermeticity of the joint of different types of metals, and resistance values of the collector terminal at 3 points.

Table 2 shows the number of defective connections between the collector terminal and the lead plates after drop test of the battery "a" of an embodiment of the present invention and the comparison battery "b".

As shown in Table 1, as the terminals A to D of the present invention used stainless steel in the bolting portion which has a higher strength than the terminal E made of aluminum of comparison 1, there was no breakage when fastening with nuts.

was observed at all with the terminal G of an embodiment of the present invention.

Furthermore, as shown in Table 2, in the battery "a" in which the leads had been secured in accordance with the present invention, poor connection observed with the battery "b" of comparison 4 was not observed. It is to be noted that in the positive and negative collector terminals, when iron, nickel, or copper is used in the positive electrode in place of stainless steel, and iron or nickel is used in the negative electrode, similar effect has been obtained.

INDUSTRIAL APPLICATION

As has been set forth above, as the present invention composes collector terminals of the positive and negative electrodes in such a way that the section forming an exterior terminal and the section where lead plates taken out from the electrode group consist of different types of metals and that these metals are integrated into one piece by solid-phase bonding or vacuum brazing, it is possible, by using a high-strength metal in the section forming the exterior terminal, to prevent a failure due to breakage of the exterior terminal even when a nut is screwed with an excessive torque when connecting a cable and the like.

Also, by integrating the metals by solid-phase bonding or vacuum brazing, it is possible to obtain good electrical conductivity of the interface of the metals.

Also, by securing a multiplicity of lead plates taken out from the electrode group and the collector terminals with screws or rivets, it is possible to reduce poor connection.

TABLE 1

|  |  |  | Material | Method of bonding | Pieces with Tensile Load Failure | Helium leak test | Terminal resistance |
|---|---|---|---|---|---|---|---|
| Positive Terminal | A | Embodiment 1 | SUS/Al | HIP | 0/100 pcs | $10^{-9}$–$^{-12}$ Torr | 0.008 m$\Omega$ |
| Positive Terminal | B | Embodiment 2 | SUS/Al | Breaking | 0/100 pcs | $10^{-9}$–$^{-12}$ | 0.009 |
| Positive Terminal | C | Embodiment 3 | SUS/Al | Explosion pressure welding | 0/100 pcs | $10^{-9}$–$^{-12}$ | 0.008 |
| Positive Terminal | D | Embodiment 4 | SUS/Al | Vacuum brazing | 0/100 pcs | $10^{-9}$–$^{-12}$ | 0.007 |
| Positive Terminal | E | Comparison 1 | Al | — | 30/100 pcs | — | 0.002 |
| Positive Terminal | F | Comparison 2 | SUS/Al | Screwing | 0/100 pcs | $\geq 10^{-2}$ | 0.2 |
| Negative Terminal | G | Embodiment 5 | SUS/Cu | HIP | 0/100 pcs | $10^{-9}$–$^{-12}$ | 0.007 |
| Negative Terminal | H | Comparison 3 | Cu | — | 0/100 pcs* | — | 0.002 |

*Slightly deformed ones, not judged defective, were observed.

TABLE 2

|  |  |  | Lead plates | Drop test failure |
|---|---|---|---|---|
| Battery | a | Embodiment 6 | Fixed | 0/100 pcs |
| Battery | b | Comparison 4 | Not fixed | 3/100 pcs |

It was also found that, compared with the terminal F of comparison 2 in which different types of metals have simply been secured with a screw, the terminals A to D in which different types of metals have been bonded in accordance with the present invention had an extremely high hermeticity of the joint of different types of metals and the resistance was also low. Also, while slightly deformed ones not as bad as to be judged defective were observed with the terminal H for comparison when fastened with a nut, no such situation

What is claimed is:

1. A non-aqueous electrolyte secondary battery comprising:
    an electrode group comprising:
        a positive electrode;
        a negative electrode; and
        a separator;
    a non-aqueous electrolyte;
    a battery case to house them; and
    a positive electrode collector terminal and a negative electrode collector terminal one end of each of which functioning as an exterior terminal;
wherein lead plates of each electrode are electrically connected to the other end of each of said collector terminals, the collector terminal of at least one of the positive and negative electrodes comprises an external section forming an exterior terminal outwardly projecting from the battery case and an internal section where lead plates taken out from the electrode group inside the battery case are connected, said external section and said internal section including respectively different metals, said external section and said internal section being integrally bonded by solid-phase bonding.

2. The non-aqueous electrolyte secondary battery of claim 1 wherein the method of solid-phase bonding is either of diffusion bonding, explosion pressure welding, or friction bonding.

3. The non-aqueous electrolyte secondary battery of claim 1 wherein the metal forming said exterior terminal of said positive electrode collector terminal is iron (Fe), nickel (Ni), copper (Cu), or stainless steel, and the metal of the section where said lead plates are connected is aluminum (Al).

4. The non-aqueous electrolyte secondary battery of claim 1 wherein the metal forming said exterior terminal of said negative electrode collector terminal is iron (Fe), nickel (Ni), or stainless steel, and the metal of the section where said lead plates are connected is copper (Cu).

5. A non-aqueous electrolyte secondary battery comprising:
   an electrode group comprising:
      a positive electrode;
      a negative electrode; and
      a separator;
   a non-aqueous electrolyte;
   a battery case to house them; and
   a positive electrode collector terminal and a negative electrode collector terminal one end of each of which functioning as an exterior terminal;
wherein lead plates of each electrode are electrically connected to the other end of each of said collector terminals, an external section of the collector terminal of at least one of the positive and negative electrodes forming an exterior terminal outwardly projecting from the battery case and an internal section where lead plates taken out from the electrode group inside the battery case are connected, said external section and said internal section including respectively different metals, said external section and said internal section being integrally bonded by vacuum brazing.

6. The non-aqueous electrolyte secondary battery of claim 5 wherein the metal forming said exterior terminal of said positive electrode collector terminal is iron (Fe), nickel (Ni), copper (Cu), or stainless steel, and the metal of the section where said lead plates are connected is aluminum (Al).

7. The non-aqueous electrolyte secondary battery of claim 5 wherein the metal forming said exterior terminal of said negative electrode collector terminal is iron (Fe), nickel (Ni), or stainless steel, and the metal of the section where said lead plates are connected is copper (Cu).

8. The non-aqueous electrolyte secondary battery of claim 1 comprising:
   an electrode group comprising:
      a positive electrode;
      a negative electrode; and
      a separator;
   a non-aqueous electrolyte;
   a battery case to house them; and
   a positive electrode collector terminal and a negative electrode collector terminal one end of each of which functioning as an exterior terminal;
   wherein a multiplicity of lead plates taken out from each of the electrodes are electrically connected by screws or rivets with the other end of the collector terminal of at least one of said positive and negative electrodes.

9. The non-aqueous electrolyte secondary battery of claim 8 wherein the collector terminal connected with said lead plates are secured with screws or rivets.

10. The non-aqueous electrolyte secondary battery of claim 2 wherein the metal forming said exterior terminal of said positive electrode collector terminal is iron (Fe), nickel (Ni), copper (Cu), or stainless steel, and the metal of the section where said lead plates are connected is aluminum (Al).

11. The non-aqueous electrolyte secondary battery of claim 2 wherein the metal forming said exterior terminal of said negative electrode collector terminal is iron (Fe), nickel (Ni), or stainless steel, and the metal of the section where said lead plates are connected is copper (Cu).

12. The non-aqueous electrolyte secondary battery of claim 5 comprising:
   an electrode group comprising:
      a positive electrode;
      a negative electrode; and
      a separator;
   a non-aqueous electrolyte;
   a battery case to house them; and
   a positive electrode collector terminal and a negative electrode collector terminal one end of each of which functioning as an exterior terminal;
   wherein a multiplicity of lead plates taken out from each of the electrodes are electrically connected by screws or rivets with the other end of the collector terminal of at least one of said positive and negative electrodes.

13. A non-aqueous electrolyte secondary battery comprising:
   an electrode group comprising:
      a positive electrode;
      a negative electrode; and
      a separator;
   a non-aqueous electrolyte;
   a battery case to house them; and
   a positive electrode collector terminal and a negative electrode collector terminal one end of each of which functioning as an exterior terminal;
   wherein lead plates of each electrode are electrically connected to the other end of each of said collector terminals, an external section of the collector terminal of at least one of the positive and negative electrodes forming an exterior terminal outwardly projecting from the battery case and an internal section where lead plates taken out from the electrode group inside the battery case are connected, said external section and said internal section including respectively different metals, said external section and said internal section being integrally bonded by vacuum brazing;
   where in a multiplicity of lead plates taken out from each of the electrodes are electrically connected by screws or rivets with the other end of the collector terminal of at least one of said positive and negative electrodes;
   wherein the collector terminal plates a reconnected with said lead plates are secured with screws or rivets.

* * * * *

UNITED STATES PATENT AND TRADEMARK OFFICE
CERTIFICATE OF CORRECTION

PATENT NO. : 6,156,452
DATED : December 5, 2000
INVENTOR(S) : Kozuki et al.

It is certified that error appears in the above-identified patent and that said Letters Patent is hereby corrected as shown below:

Column 12,
Line 63, delete "a reconnected" and insert -- are connected --.

Signed and Sealed this

Sixteenth Day of October, 2001

Attest:

NICHOLAS P. GODICI
Attesting Officer
Acting Director of the United States Patent and Trademark Office